United States Patent
Wickman

(10) Patent No.: US 7,165,895 B2
(45) Date of Patent: *Jan. 23, 2007

(54) METHOD OF GUIDING AN OPTICAL SIGNAL

(75) Inventor: Randy Wickman, Cadott, WI (US)

(73) Assignee: Emcore Corporation, Albuquerque, NM (US)

( * ) Notice: Subject to any disclaimer, the term of this patent is extended or adjusted under 35 U.S.C. 154(b) by 170 days.

This patent is subject to a terminal disclaimer.

(21) Appl. No.: 10/662,768

(22) Filed: Sep. 15, 2003

(65) Prior Publication Data

US 2004/0067029 A1    Apr. 8, 2004

Related U.S. Application Data

(60) Provisional application No. 60/411,136, filed on Sep. 16, 2002.

(51) Int. Cl.
*G02B 6/42* (2006.01)
*G02B 6/26* (2006.01)

(52) U.S. Cl. .............................. 385/88; 385/39; 385/89

(58) Field of Classification Search ............ 385/88–89, 385/39, 52, 53
See application file for complete search history.

(56) References Cited

U.S. PATENT DOCUMENTS

| 6,793,409 B2 * | 9/2004 | Wickman et al. ............. 385/88 |
| 2004/0213538 A1 * | 10/2004 | Trezza et al. ................ 385/137 |
| 2005/0036731 A1 * | 2/2005 | Maxwell ...................... 385/16 |

* cited by examiner

*Primary Examiner*—Frank G. Font
*Assistant Examiner*—Michael P. Mooney
(74) *Attorney, Agent, or Firm*—Welsh & Katz, Ltd.

(57) ABSTRACT

A method and apparatus are provided for guiding an optical beam progressing along an axis of transmission defined by an optical converter. The method includes the steps of disposing an optically transparent substrate in the axis of transmission of the optical converter with a predominant plane of the substrate disposed perpendicular to the axis of transmission and so that the optical beam passes directly through the substrate and disposing a plurality of refracting or reflecting elements around the axis of transmission within a body of the optically transparent substrate.

29 Claims, 8 Drawing Sheets

Top view

Cut away side view

73 — Air holes or lower index material --- the glue that holds the glass layers together Light confinement region Optical Via Rev 0

The eight dark circles will be holes that are placed in the glass surface. The diameter of each of the holes is 16μm at the surface of the glass. These eight holes will make up an optical via that will be centered over each of the Rx device's optical ports. A mask could be made that would produce all twelve vias at the same time or each via could be made individually.

Optical Via Structure

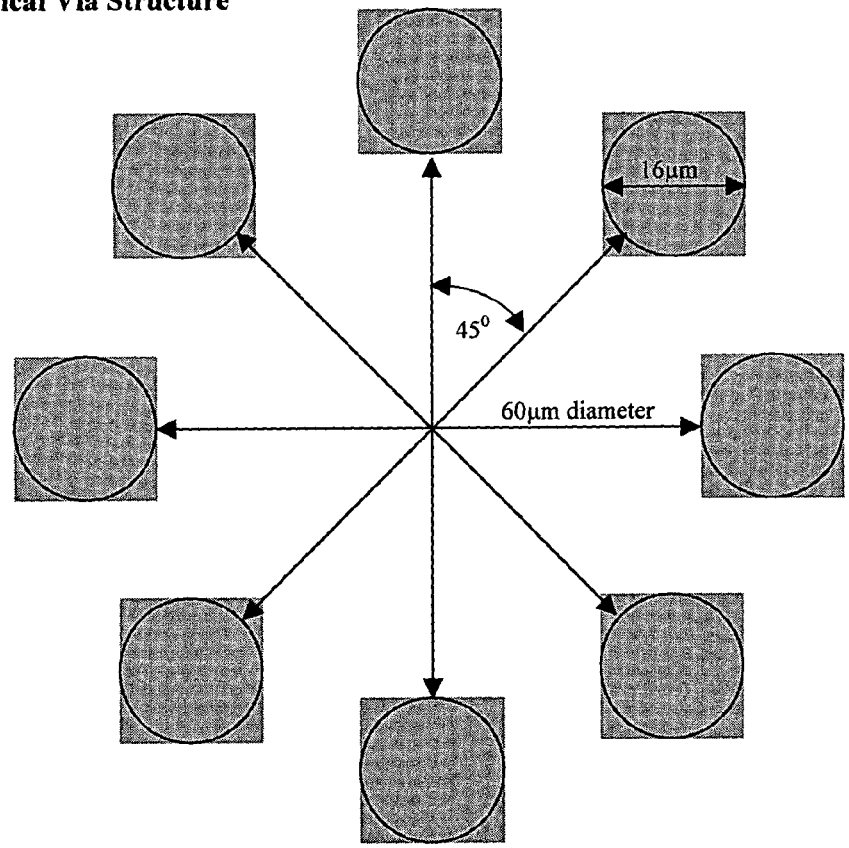

Array of twelve vias centered over each optical port 12 vias on 250μm centers, vias will be ~30μm to 50μm deep in glass Array of twelve vias centered over each optical port 12 blue circles show the PD 70μm aperture

METHOD OF GUIDING AN OPTICAL SIGNAL

FIELD OF THE INVENTION

The field of the invention relates to communication systems and more particularly to methods of making electro-optical connections on circuit boards.

BACKGROUND OF THE INVENTION

This application is a continuation-in-part of U.S. Provisional Patent Application No. 60/411,136, filed on Sep. 16, 2002, now abandoned.

Optical connections to circuit boards in the past have typically been limited to a single optical fiber at a time. Such connections have typically involved the use of an optical transmitter or detector placed within a cylindrical metal enclosure with a transparent top (i.e., a "TO can ") and soldered to a circuit board.

Since TO cans do not inherently have provisions for cable attachment, an annular cable supporting structure is typically attached to the circuit board that also supports the TO can. An example of a TO can is shown in FIG. 1. Typically, the annular structure is placed over the TO can with a central hole of the structure disposed over the transparent top of the TO can to bring the optical fiber of the waveguide into alignment with the optical device within the TO can. To secure the waveguide to the board, a female thread on the waveguide engages a male thread disposed around the hole in the annular structure.

While the use of waveguides with TO cans has been successful, it is also difficult to use and time consuming to assemble. Often the optical device within the TO can is not precisely aligned with the outside of the TO can. As a consequence, alignment is typically achieved by trial and error. Often the optical device is activated and the waveguide is moved around a predetermined path over the TO can to identify the location of greatest signal transfer. The supporting structure may then be secured to the circuit board in that location.

In addition, TO cans may require complex lensing systems to accurately transfer optical signals to optical fibers. In contrast, by flip chipping optical IC's to substrate, where the optical signals are emitted from the same surface as the electrical contacts, optical fibers can be placed closer to the source of light. This in turn may reduce the need for lensing systems.

However, as many optical devices are placed on a substrate, cross talk of optical signals may require further lensing to ensure high signal integrity, Where many connectors are required, the most of assembly becomes prohibitive. Accordingly, a need exists for a reliable method of couple more than 1 optical signal to respective optical fibers, while maintaining signal integrity, reducing the cost, and reducing the complexity of the coupling system.

SUMMARY

A method and apparatus are provided for guiding an optical beam progressing along an axis of transmission defined by an optical converter. The method includes the steps of disposing an optically transparent substrate in the axis of transmission of the optical converter with a predominant plane of the substrate disposed perpendicular to the axis of transmission and so that the optical beam passes directly through the substrate and disposing a plurality of reflecting or refractive elements around the axis of transmission within a body of the optically transparent substrate.

BRIEF DESCRIPTION OF THE DRAWINGS

FIG. 8 is a top view of an optical via that may be used by the assembly of FIG. 2;

DETAILED DESCRIPTION OF AN ILLUSTRATED EMBODIMENT

Figure 1:
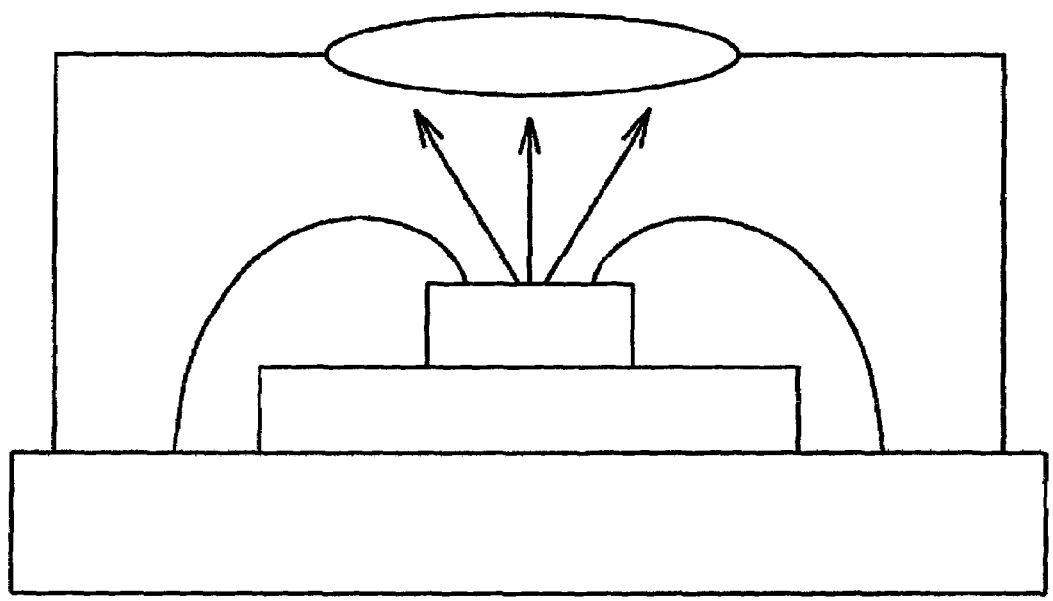
FIG. 1 is a front view of the prior art related to the present invention.
Figure 2:
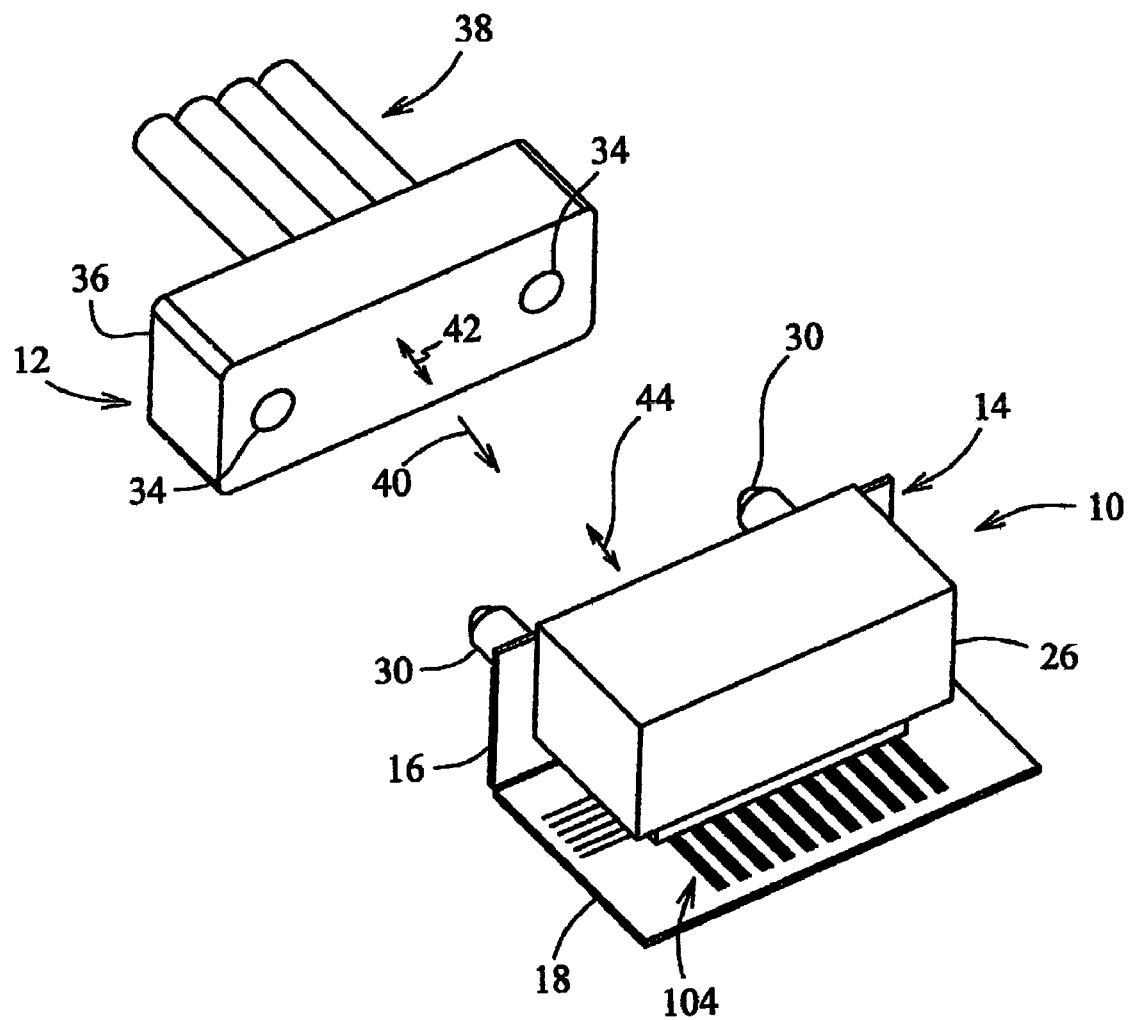
FIG. 2 is an isometric view of an optoelectronic converter assembly in accordance with an illustrated embodiment of the invention.

FIG. 2 is a rear perspective view of an optoelectronic converter assembly 10. A partial view of the connector 12 is depicted showing the direction 40 from which an optical connector 12 would engage the converter assembly 10. As can be seen, a first set of guides (e.g., guide pins 30) of the converter assembly 10 engage a second, complementary set of guides (e.g., alignment apertures 34) within a plug 36 to bring an axis of transmission 42 of the optical fibers 38 into final alignment with an axis of transmission 44 of the optical converters 22 (shown in FIG. 3) of the converter assembly 10. The plug 36 may be an MT connector or other 2D connector.

Figure 3:
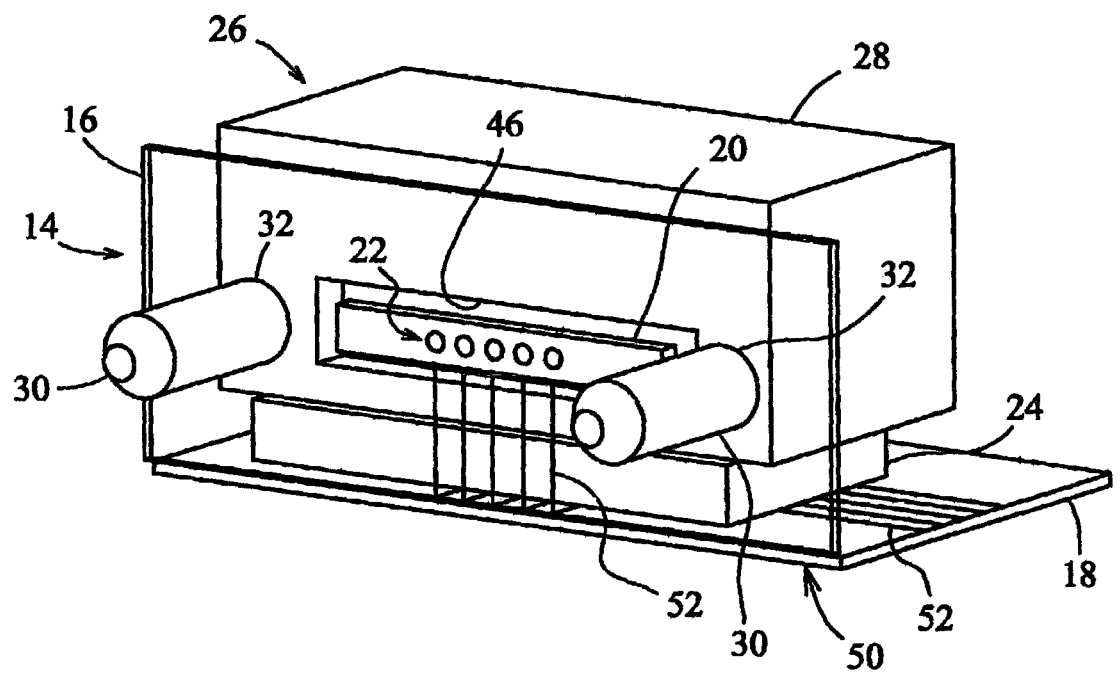
FIG. 3 is a front view of the converter assembly of FIG. 2 without the optical fiber plug.

FIG. 3 depicts a front perspective view of the optoelectronic converter assembly 10. As shown, the converter assembly 10 generally includes a substrate assembly 14, guide pins 30 and a pin holder assembly 26. The substrate assembly 14 may include a first, optically transparent mounting substrate 16 and second substrate 18 connected to the first substrate 16 by a hinge 50.

In general, the substrate assembly 14 may be fabricated from a single slab of optically transparent material (e.g., a slab of glass). Conductive traces 52 may be disposed on the first side of the slab using a suitable technology (e.g., thin-film photolithography). The substrate assembly 14 maybe used in its planar state (i.e., substrates 16 and 18 may lie in the same plane) or in the form shown in FIG. 3. To obtain the structure shown in FIG. 3, the material of the substrate 14 may be scored along the hinge area on a second side of the slab using an appropriate scoring technology (e.g., diamond blade cutting saw, laser ablation, etc.). The score may be provided substantially through the thickness of the material (e.g., about 75% through). (If the material is scored through the entire thickness, this could damage or break the conductive traces 52.) Upon scoring the material, the first substrate 16 and second substrate 18 may be broken along the score line and rotated around the scored line until the two substrates 16, 18 are separated by ninety degrees as shown.

The optically transparent substrate 16 may also have an optical (photonics) converter (e.g., an optical array) 20 mounted between the first substrate 16 and the pin holder assembly 26 on a backside of the first substrate 16, as shown in the figure. The optical array 20 is visible in FIG. 3 by looking through the transparent substrate 16.

Optical energy of the signals exchanged between the converters 22 and fibers 38, are transmitted directly through the substrate. As used herein, an optical signal that passes directly through the substrate 16 means that it passes through the material that forms the substrate 16. It does not mean that it passes through a hole in the substrate 16. It should also be noted that the axis of transmission 44 of the optical signal is perpendicular to a predominant plane of the substrate 16 where the predominant plane is defined by the surface of the substrate 16 to which the converter 22 is mounted.

The optical array 20 may be a conventional (e.g., a VCSEL) array of transmitting devices 22 or may be any of a number of other optical devices (e.g., an array of PIN diodes, an array that includes a mixtures of optical emitters and optical detectors, etc.) 22. In general, an axis of transmission of each optical device 22 of the array 20 passes directly through the substrate 16 regardless of whether the direction is into or out of the device 22.

Next, the array 20 and a signal processor 24 may be connected to the traces 52 of the substrate 14. Connection may be accomplished by a suitable connection method (e.g., wave soldering, stud bumping, etc.).

A set of guide pin apertures 32 (also shown in FIG. 4) may be created in the substrate 16 by laser ablation. The apertures 32 may be located on a common centerline passing through each of the devices 22 and at a predetermined distance from either side of the array 20. Alignment of the laser for ablating the apertures 32 may be accomplished automatically using an image recognition system programmed to recognize the optically active ports of the devices 22 of the array 20 looking through the transparent substrate 16.

It should be noted in this regard that the use of a transparent substrate 16 allows the guide pin apertures 32 (and guide pins 30) to be precisely aligned (i.e., within ½ micron) with the optical converter devices 22. Alignment of the guide pin apertures 32 to the devices 22, a priori, also results in a precise alignment of the plug 36 and fibers 38, to the devices 22 without the use of trial and error alignment procedures.

The pins 30 may then be assembled to (e.g., pressed into pre-drilled holes within) the pin holder block 28 and the pin holder assembly 26 may be assembled to the substrate assembly 14. It may be noted in this regard that the pin holder block 28 may be provided with a recess 46 to receive the array 20 while the adjoining surface of the pin holder assembly 26 on that same side contacts the substrate 16 around the array 20.

To assemble the pin holder assembly 26 to the substrate assembly 14, the rear surface of the array 20 may be partially coated with an electrically insulative, thermally conductive glue. The pins 30 of the pin holder assembly 26 may be placed into the apertures 32 and advanced through the apertures 32 until a back surface of the recess 46 engages the array 20 and glue disposed on the rear surface of the array 20.

Figure 4:
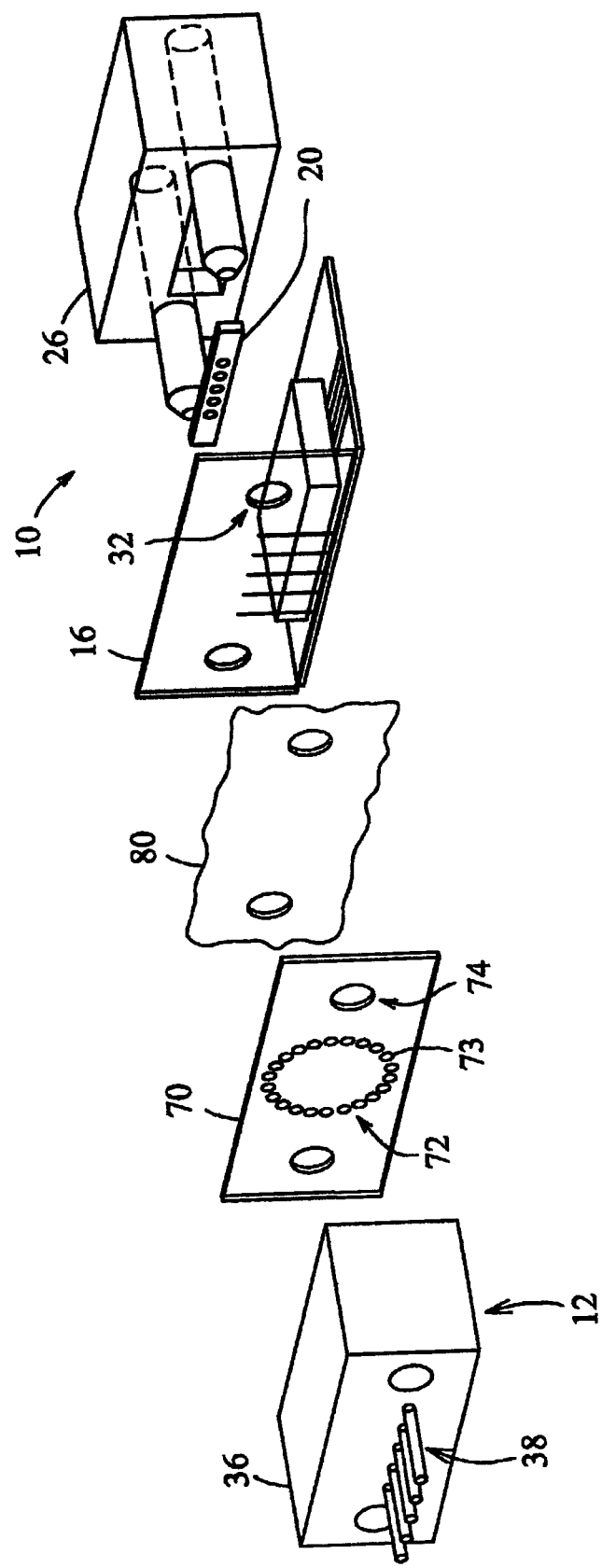
FIG. 4 is an isometric view of an embodiment of the present invention.

As shown in FIG. 4, an auxiliary substrate 70 may be used in conjunction with the first optically transparent substrate 16. A predominant plane of the additional substrate 70 is also disposed perpendicular to the axis of transmission 44 of the optical converter 20.

The substrate 70 may also comprise a rigid, optically transparent material, such as glass. Glass has been found to display suitable properties, but the material selection could include those displaying similar properties, (e.g., plastic, ruby crystal, silicon, gallium-arsenide, etc.). The substrate 70 may also be provided with alignment apertures 74 similar to the apertures 32 in the first optically transparent substrate 16. The apertures may be located in the substrate such that the guide pins 30 may be inserted through the apertures 74, and light from the optical array 20 passes substantially through the center portion of the body of the substrate 70.

As shown in FIG. 4, the optically transparent substrate 70 may be provided with an optical-wavefront transforming or confining structure, here called an optical via (or waveguide) 72. As used herein, an optical via is an optical signal path through a substrate surrounded by a number of refractive elements. In effect, the via 72 functions to guide the optical wave without the necessity of completely surrounding the axis of transmission with the sheath that is characteristics of optical fibers. The via 72 is particularly effective in providing a transition between an optical source (with very little control of wavefront expansion) and an optical fiber (with an external sheath).

A single, greatly enlarged optical via 72 is shown in FIG. 4 to illustrate the concept. It would be understood that in most cases an optical via 72 would be provided for each optical device 22 and that the diameter of the optical via 72 would be commensurate with the diameter of the respective optical device 22 and fiber 38.

The optical via 72 may be placed in the substrate 70 such that light is directed through the body of the substrate 70 encompassed by the optical via 72. The optical via may comprise a plurality of reflective elements (e.g., apertures) 73 disposed in the substrate and grouped into a desired shape (e.g., circular, square, octagonal, etc.). In a preferred embodiment of the present invention, the apertures 73 are circularly grouped as shown in order to promote a more uniform light profile. In this regard, it should be noted that the elements 72 of the via 72 is disposed closely around the axis of transmission 44 of each optical converter, not around the periphery of the substrate 70.

The apertures 73 may be fabricated by a conventional laser ablation process. The apertures may or may not be provided through the entire thickness of the substrate. Low tolerance alignment is not as critical in placement of the confinement apertures 73 as compared to the alignment apertures 32, 74. Thus, any suitable fabrication technique may be used.

Figure 5:
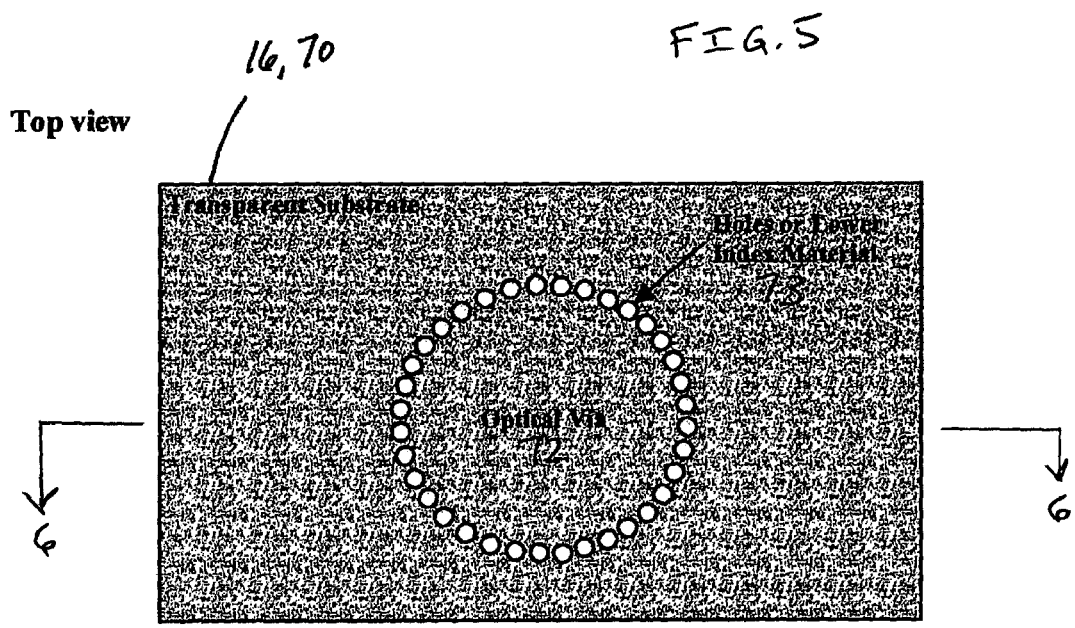
FIG. 5 is a front view of an optical via that may be used within the assembly of FIG. 2.
Figure 6:
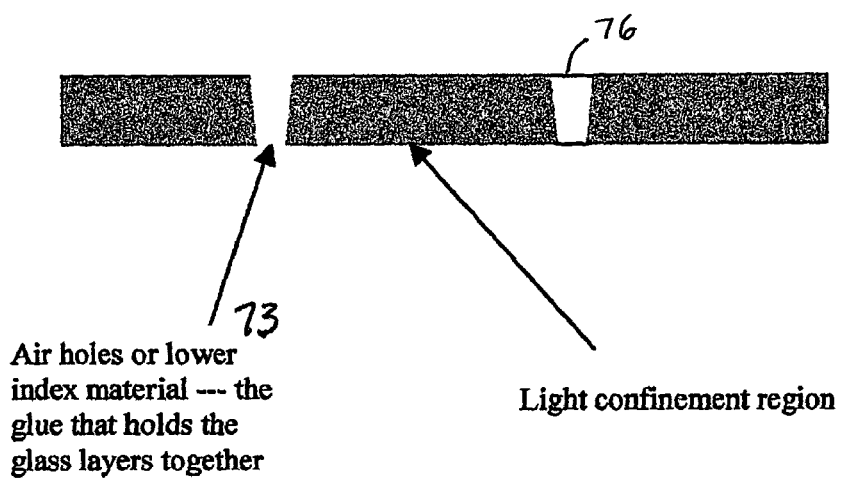
FIG. 6 is a cut-away side view of an optical via of FIG. 5.

The apertures 73 in the substrate 70 (FIGS. 5–6) may be filled with a polyimide, or similar material 76 having an index of refraction lower than that of the substrates 70. With a lower index of refraction in the apertures 17, light reflects away from the apertures 73 and into the area encompassed by the confinement via 72. The apertures 73 would act as a light confining and shaping structure by deflecting light towards the center of the circular structure. These apertures 73 are not limited to a certain type of filling, but could be left unfilled (i.e., filled with air).

The index of refraction of the substrate 70 or apertures 73 could be changed to direct light as desired. Material diffusion, compression, or ultraviolet exposure are examples of methods of creating an index step in refraction to change a boundary region from guiding to non-guiding regions. Anti-reflection coatings and structures can also be used to minimize the coupling lossed between the optical array 20 and optical fibers 38. They may be disposed on the surface of the substrate 70 nearest to the optical fibers 38.

Separating the substrates may be an optically transparent, adhesive-like material 80 (FIG. 4) to structurally connect the substrates and further promote beam uniformity and integrity. The optically transparent adhesive 80 may refract or attenuate light passing through it while mechanically affixing the substrates 16,70.

In a preferred embodiment of the present invention, the index of refraction of the optically transparent adhesive 80 is lower than that of the substrates 16,70 in order to promote a more confined beam profile. The same optically transparent adhesive could also be used to fill the optical via apertures 73 in the substrate 70.

Although FIG. 4 shows one additional substrate 70, any number of additional substrates can be used in the invention. By adding additional substrates to the converter assembly 10, the rigidity of the converter assembly 10 can be increased and/or the optical beam shaping between the fiber and the optical device can be increased. The relatively thin substrate 16 can be damaged by the external plug 12 making contact with it. Effectively increasing the thickness of the substrate 16 by sandwiching it to an additional planar substrate can increase the converter assembly's 10 ability to withstand shear stress caused by mating with the external plug 12.

It has been found that increasing the thickness of the substrate 16 by initially using a thicker substrate 14 hinders smaller package size in terms of the horizontal planar element 18. That is, using a thicker substrate 14 adds to the package height. In addition, light traveling through a thicker substrate without the use of a converging adhesive will tend to be more divergent, thus decreasing the amount of light coupled into an optical fiber. Sandwiching an optically transparent adhesive that has a lower index of refraction than the substrates 16,70 allows the light to be guided to a more uniform beam profile.

In an alternative embodiment of the present invention, the optical via structure 72 could be provided in the first optically transparent substrate 16. In this case, the additional substrate 70 would not be used. Using the optical via 72 with the first substrate 16 aids in the confining of light without the addition of materials and extra size to the package.

Figure 7:
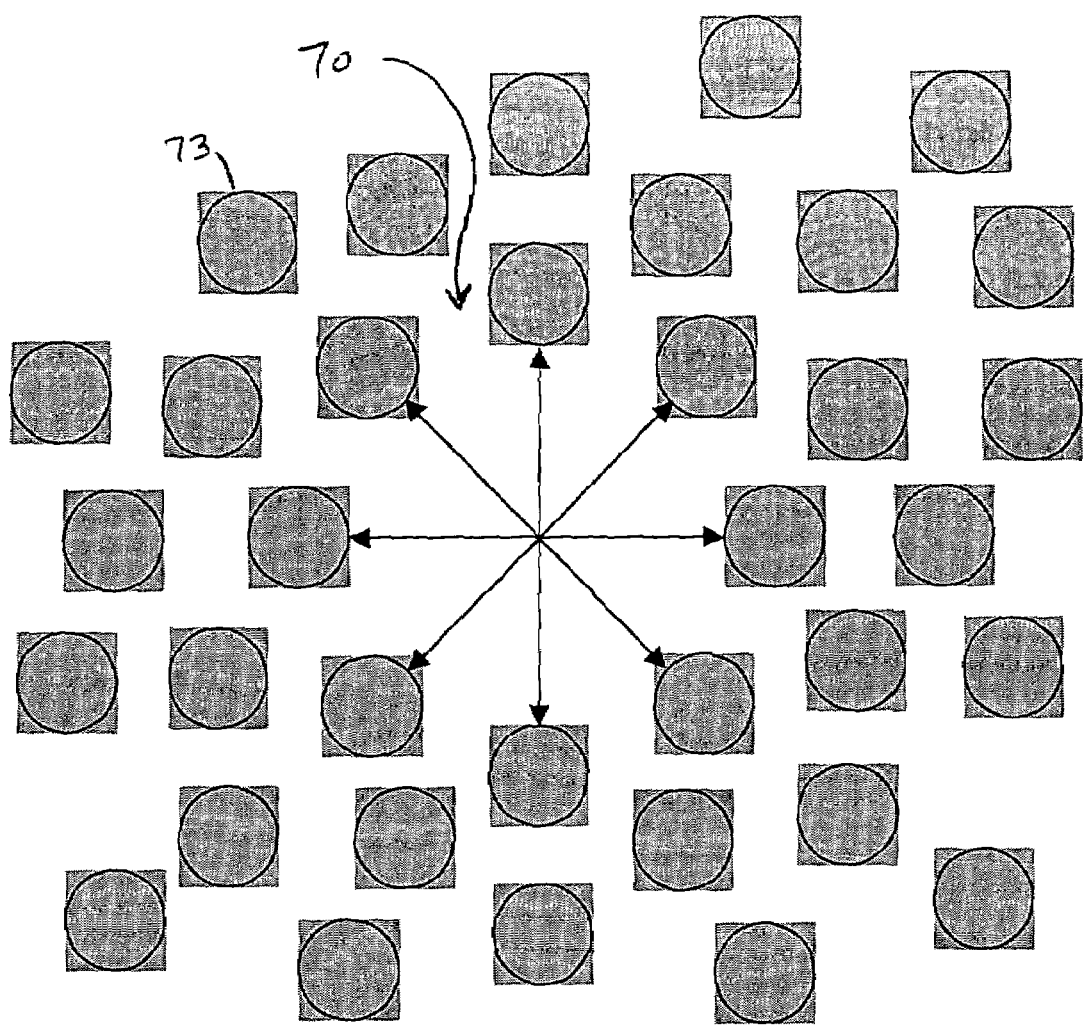
FIG. 7 is an array of reflecting or refractive elements of an optical via that may be used by assembly of FIG. 2.

In another embodiment of the invention, the characteristics of an optical transmission path may be enhanced by surrounding the via 70 with a random array of apertures 73 as shown in FIG. 7. It has been found in the example of FIG. 7 that light that escapes a first circle of apertures 73 may be reflected by the random array of apertures 73 that lie outside of a primary enclosure of the via 70.

Figure 9:
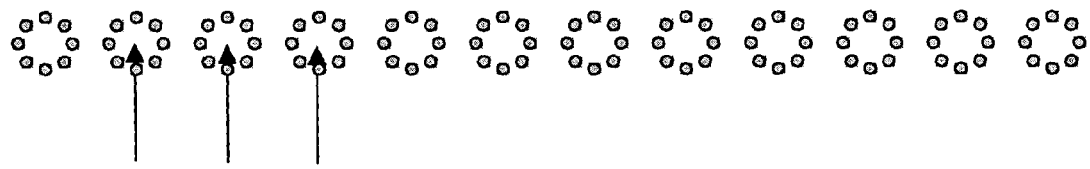
FIG. 9 depicts an array of vias that may be used by the assembly of FIG. 2.
Figure 10:
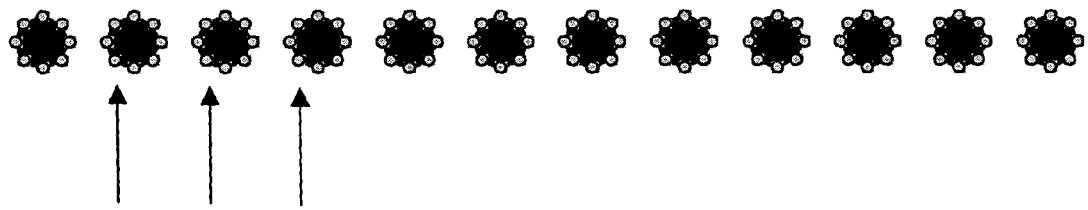
FIG. 10 depicts an array of vias disposed over optical converters of the assembly of FIG. 2.

FIGS. 8–10 depicts details of specific example of an array of optical vias 70 used in conjunction with a device with twelve optical ports 22. FIG. 8 depicts a set of 8 apertures forming a via 70 with a diameter of 60 μm and where each aperture has a diameter of 16 μm. FIG. 9 depicts the vias 70 of FIG. 8 applied to the twelve optical ports 22 with 250 μm center spacing. As shown, each aperture 73 may have a depth of 30–50 μm in a substrate of glass that may have an original thickness of 100 μm. FIG. 10 depicts the vias 70 of FIG. 9 as they would appear over a set of pin diodes (PDs) having a 70 μm aperture.

A specific embodiment of an optical converter has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention and any and all modifications, variations, or equivalents that fall within the true spirit and scope of the basic underlying principles disclosed and claimed herein.

What is claimed is:

1. A method of guiding an optical beam progressing along an axis of transmission defined by an optical converter, such method comprising the steps of:
    disposing an optically transparent substrate in the axis of transmission of the optical converter with a predominant plane of the substrate disposed perpendicular to the axis of transmission and so that the optical beam passes directly through the substrate; and
    disposing a plurality of discrete refracting or reflecting elements around the axis of transmission within a body of the optically transparent substrate, said plurality of refracting or reflecting elements selected to reflect light away from the plurality of refracting or reflecting elements to thereby confine the optical beam to the axis of transmission.

2. The method of guiding the optical beam as in claim 1 further comprising defining the optically transparent substrate as a mounting substrate.

3. The method of guiding the optical beam as in claim 1 further comprising defining the optically transparent substrate as an auxiliary substrate.

4. The method of guiding the optical beam as in claim 3 further comprising mounting the optical converter to a mounting substrate so that the axis of transmission passes directly through the mounting substrate.

5. The method of guiding the optical beam as in claim 4 further comprising justaposing the mounting substrate with the auxiliary substrate.

6. The method of guiding the optical beam as in claim 1 further comprising defining the plurality of refracting or reflecting elements as apertures within the optically transparent substrate.

7. The method of guiding the optical beam as in claim 6 further comprising filling the plurality of apertures with a material with a lower index of refraction than the optically transparent substrate.

8. The method of guiding the optical beam as in claim 1 further comprising disposing the plurality of refractive or reflective elements in a circle around the axis of transmission defined by the optical converter.

9. The method of guiding the optical beam as in claim 1 further comprising disposing the plurality of refractive or reflective elements in a square around the axis of transmission defined by the optical converter.

10. The method of guiding the optical beam as in claim 1 further comprising disposing the plurality of refractive or reflective elements in a octagon around the axis of transmission defined by the optical converter.

11. The method of guiding the optical beam as in claim 1 further comprising disposing the plurality of refractive or reflective elements in a random array around the axis of transmission defined by the optical converter.

12. An apparatus for guiding an optical beam progressing along an axis of transmission defined by an optical converter, such apparatus comprising:
    an optically transparent substrate disposed in the axis of transmission of the optical converter with a predominant plane of the substrate disposed perpendicular to the axis of transmission and so that the optical beam passes directly through the substrate; and a plurality of descrete refracting or reflecting elements adapted to reflect the optical beam away from the plurality of refracting or reflecting elements, said refracting or reflecting elements being disposed around the axis of transmission within a body of the optically transparent substrate to confine the optical beam to the axis of transmission.

13. The apparatus for guiding the optical beam as in claim 12 further comprising defining the optically transparent substrate as a mounting substrate.

14. The apparatus for guiding the optical beam as in claim 12 further comprising defining the optically transparent substrate as an auxiliary substrate.

15. The apparatus for guiding the optical beam as in claim 14 further comprising the optical converter mounted to a mounting substrate so that the axis of transmission passes directly through the mounting substrate.

16. The apparatus for guiding the optical beam as in claim 15 further comprising the mounting substrate justaposed with the auxiliary substrate.

17. The apparatus for guiding the optical beam as in claim 12 further comprising defining the plurality of refracting or reflecting elements as apertures within the optically transparent substrate.

18. The apparatus for guiding the optical beam as in claim 17 further comprising the plurality of apertures filled with a material with a lower index of refraction than the optically transparent substrate.

19. The apparatus for guiding the optical beam as in claim 17 further comprising the plurality of apertures filled with a reflective material.

20. The apparatus for guiding the optical beam as in claim 12 further comprising the plurality of refracting or reflective elements disposed in a circle around the axis of transmission defined by the optical converter.

21. The apparatus for guiding the optical beam as in claim 12 further comprising the plurality of refractive or reflective elements disposing in a square around the axis of transmission defined by the optical converter.

22. The apparatus for guiding the optical beam as in claim 12 further comprising the plurality of refractive or reflective elements disposing in a octagon around the axis of transmission defined by the optical converter.

23. The apparatus for guiding the optical beam as in claim 12 further comprising the plurality of refractive or reflective elements disposing in a random array around the axis of transmission defined by the optical converter.

24. A method for guiding an optical signal within an electrooptic signal processing assembly, such method comprising the steps of:
providing a first and second optically transparent substrate with a plurality of alignment apertures formed in the substrates;
providing an optical device with a transmission path of the optical device passing directly through the bodies of the two optically transparent substrates,
providing an optical via for shaping the transmission path of the optical signal, said optical via comprising a plurality of apertures formed in the second substrate that reflect light away from the plurality of refracting or reflecting elements to confine the optical signal to the optical via such that the transmission path of the optical device passes directly through the body of the substrate defined by the area encompassed by the plurality of apertures;
aligning an optical fiber holder to the optical device using a plurality of guide pin apertures in the substrate and a respective plurality of guide pins and;
coupling an optical signal of the optical device of the optical array to a respective optical fiber of the aligned optical fiber holder.

25. A method for providing an electro-optic signal processing assembly, such method comprising the steps of:
providing an optically transparent substrate with a plurality of apertures that reflect light away from the plurality of refracting or reflecting elements formed in the substrate;
providing an optical device with a transmission path of the optical device passing directly through a portion of the body of the optically transparent substrate defined by the area encompassed by the plurality of apertures;
aligning an optical fiber holder to the optical device using a plurality of guide pin apertures in the substrate and a respective plurality of guide pins and;
coupling an optical signal of the optical device of the optical array to a respective optical fiber of the aligned optical fiber holder where the optical signal passes directly through the substrate and where the plurality of apertures together confine the optical signal within the area encompassed by the plurality of apertures.

26. An electro-optic signal processing device, such package comprising:
a first and second optically transparent substrate with a plurality of alignment apertures formed in the substrates;
an optical device having a transmission path of the optical device passing directly through the bodies of the two optically transparent substrates,
an optical via comprising a plurality of apertures that reflect light away from the plurality of refracting or reflecting elements formed in the second substrate, such that an optical signal from the optical device traveling along the transmission path of the optical device passes directly through the body of the substrate defined by the area encompassed by the plurality of apertures and is confined within optical via;
means for holding an optical fiber and for guiding the optical device into alignment with a respective optical fiber using a plurality of guide pins and alignment apertures disposed in the substrate.

27. An electrooptic signal processing device, such package comprising:
an optically transparent substrate having apertures that reflect light away from the plurality of refracting or reflecting elements formed in the substrate, where the apertures together form an optical via;
an optical device having a transmission path of an optical beam that passes directly through a portion of the body of the optically transparent substrate defined by the optical via and where the apertures confine the optical beam to the via; and
means for holding an optical fiber and for guiding the optical device into alignment with a respective optical fiber using a plurality of guide pins and alignment apertures disposed in the substrate.

28. The method of guiding the optical beam as in claim 1 further comprising the plurality of refracting or reflecting elements guiding the optical beam along the axis of transmission.

29. The apparatus for guiding the optical beam as in claim 12 further comprising the plurality of refracting or reflecting elements being adapted to guide the optical beam along the axis of transmission.

* * * * *